United States Patent [19]

Schramm et al.

[11] Patent Number: 5,523,672
[45] Date of Patent: Jun. 4, 1996

[54] VOLTAGE-REGULATOR FOR REGULATING THE VOLTAGE OF AN ALTERNATOR

[75] Inventors: Guenter Schramm, Vaihingen-Enzweihingen; Walter Kohl, Bietigheim-Bissingen; Friedhelm Meyer, Illingen; Rainer Mittag, Kornwestheim, all of Germany

[73] Assignee: Robert Bosch GmbH, Stuttgart, Germany

[21] Appl. No.: 351,371

[22] PCT Filed: Mar. 18, 1994

[86] PCT No.: PCT/DE94/00297

§ 371 Date: Dec. 8, 1994

§ 102(e) Date: Dec. 8, 1994

[87] PCT Pub. No.: WO94/24755

PCT Pub. Date: Oct. 27, 1994

[30] Foreign Application Priority Data

Apr. 8, 1993 [DE] Germany .................. 43 11 670.1

[51] Int. Cl.[6] .................................................. H02J 7/14
[52] U.S. Cl. .................. 322/25; 322/28; 322/59
[58] Field of Search .......................... 322/25, 28

[56] References Cited

U.S. PATENT DOCUMENTS

| 4,388,587 | 6/1983 | Lamoth et al. | 323/283 |
|---|---|---|---|
| 4,584,515 | 4/1986 | Edwards | 322/28 |
| 4,629,968 | 12/1986 | Butts et al. | 322/29 |
| 4,636,706 | 1/1987 | Bowman et al. | 322/28 |
| 5,225,764 | 7/1993 | Falater | 322/28 |
| 5,231,344 | 7/1993 | Marumoto et al. | 322/14 |
| 5,323,102 | 6/1994 | Torii et al. | 322/90 |
| 5,467,008 | 11/1995 | Uchinami | 322/27 |

*Primary Examiner*—Steven L. Stephan
*Assistant Examiner*—Nicholas Ponomarenko
*Attorney, Agent, or Firm*—Michael J. Striker

[57] ABSTRACT

The description concerns a voltage regulator (12) for regulating the output voltage (UB+) of an alternator (10) which is driven by an internal combustion engine. The voltage regulator (12) has an additional circuit (24) which evaluates the exciter current duty cycle (T) and supplies a signal (S1) at its output which is high when the exciter current duty cycle is high and low when the exciter current duty cycle is low. The circuit (24) is integrated in the voltage regulator (12) and the output signal (S1) supplied by it is transmitted via an additional regulator terminal (DA) and can be fed to the control device (25) of the internal combustion engine, where it is used, for instance, to increase the idling speed of the engine and accordingly also to increase the alternator speed and thus the power delivered by the alternator (10). It is also possible to switch off unnecessary consumers with this signal.

10 Claims, 1 Drawing Sheet

VOLTAGE-REGULATOR FOR REGULATING THE VOLTAGE OF AN ALTERNATOR

PRIOR ART

The invention is directed to a voltage regulator for regulating the output voltage of an alternator driven by an internal combustion engine as set forth in the generic part of the main claim.

Currently, three-phase alternators are preferably used for supplying the electrical consumers of a motor vehicle. These alternators generate an AC voltage or alternating current which is rectified in a rectifier arrangement connected downstream of the alternator and is used to supply consumers and charge the battery. Since the output voltage of the three-phase alternator substantially depends upon the rate of rotation of the alternator, a voltage regulator must be used to achieve the desired constant output voltage.

In separately excited alternators, the voltage regulator influences the alternator exciter current. The exciter current switches on and off continuously by means of a transistor. The given exciter current duty cycle depends on the magnitude of the load on the alternator and on the speed of the internal combustion engine and accordingly on the speed of the alternator.

An alternator/voltage regulator system of this kind is known, for example, from U.S. Pat. No. 4,424,477. In this known system, the voltage of the battery of the vehicle is measured and tested to determine whether or not this voltage lies below a set value. If it does, the idling speed of the internal combustion engine and that of the alternator is increased so as to increase the output power of the alternator. This known voltage regulator has the disadvantage that the battery voltage must be measured additionally to detect a poor charging state.

ADVANTAGES OF THE INVENTION

The voltage regulator according to the invention for regulating the output voltage of an alternator which is driven by an internal combustion engine has the advantage over the prior art that the exciter voltage duty cycle is measured directly and is used to form a suitable digital signal so that additional steps required as a result of a poor charge state or intensive loading of the alternator can be carried out in a simple manner.

In an advantageous manner, a signal can be tapped directly via an additional connection at the regulator so that it may be determined on the basis of the level of this signal whether or not to carry out additional steps, e.g., an increase in the idling speed.

DRAWING

An embodiment example of the invention is shown in the drawing and explained in more detail in the following description. FIG. 1 shows a conventional alternator/regulator system of a motor vehicle which is supplemented by the circuit according to the invention. This circuit according to the invention is shown in more detail in FIG. 2.

DESCRIPTION OF THE EMBODIMENT

Figure 1:
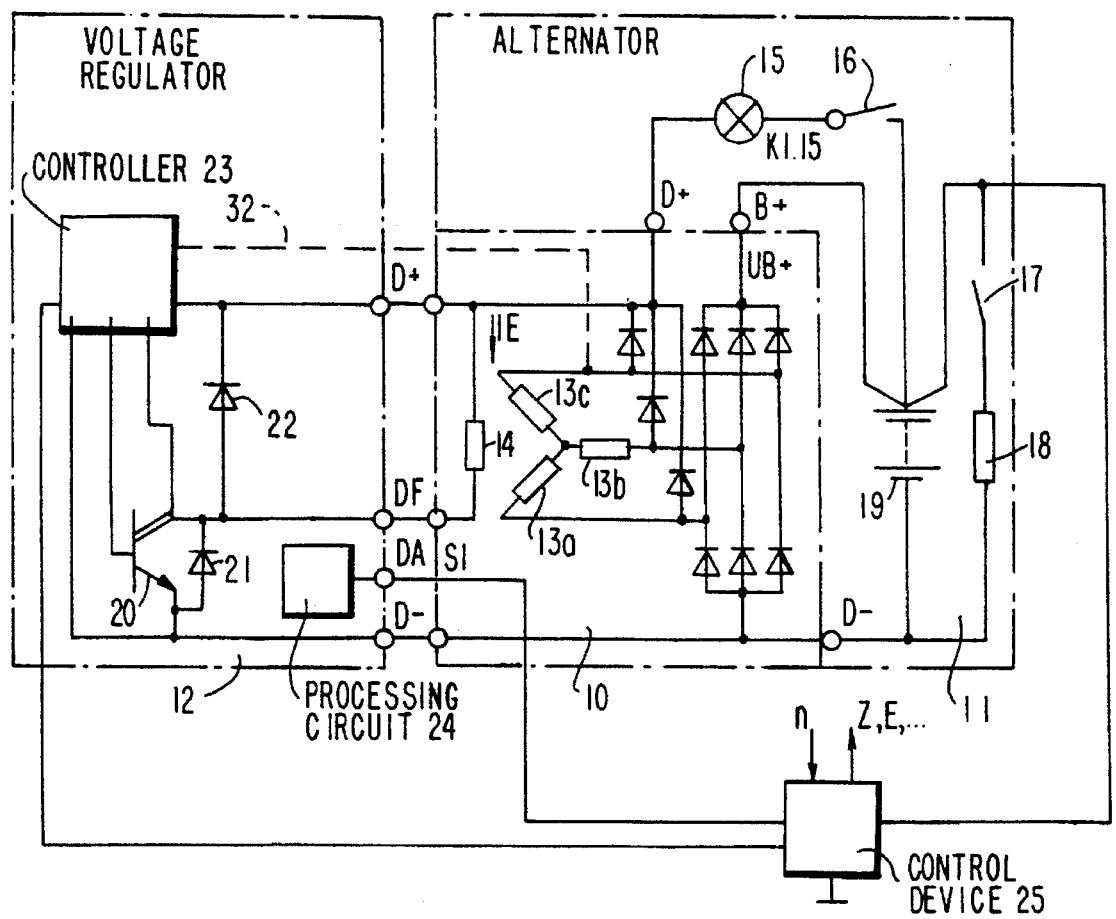

A three-phase alternator 10 supplying an onboard power supply system, designated by 11, is shown schematically in FIG. 1. The alternator output voltage UB+ is regulated by a voltage regulator 12. The connection terminals in an alternator voltage system of this kind are conventionally designated by D−, DF, D+ and B+.

The alternator 10 has an exciter winding 14 in addition to stator windings 13a, 13b, 13c. The drawing also shows rectifier bridges 15a, 15b and 16 for rectifying the alternator output current or exciter current.

Only the following elements of the motor vehicle power supply system are shown in the drawing: charge level indicator light 15, terminal KL.15 which is connected with the ignition switch 16, a switch 17, a consumer 18, and battery 19 to which the individual consumers are connected.

The parts of the voltage regulator essential to an understanding of the invention are a switching element, e.g., a switching transistor 20 with a parallel-connected protective diode 21, a freewheel diode 22, and a controller 23 driving the transistor 20.

The exciter winding 14 between connections D+ and DF and the transistor 20 between DF and D− form a series connection. The current flow IE through the exciter winding 14 is controlled by opening and closing the switching path of the transistor 20. The duty cycle changes depending on the speed or load of the alternator. At a higher alternator load and/or lower speed n, the transistor 20 remains in the conducting state substantially longer; at a lower load the blocking state of the transistor is prolonged. Thus, the exciter current duty cycle T is used as a criterion for detecting the alternator load.

As described thus far, the voltage regulator/alternator arrangement for supplying an onboard power supply is prior art and is known, e.g., from DE-OS 38 43 163. According to the invention, it is provided in addition to install a circuit 24 between terminal DF and D− or in the driving stage of the transistor 20, which circuit 24 directly receives and processes the exciter current duty cycle T applied to terminal DF.

The signal obtained in so doing is outputted via terminal DA and can be further processed for determined regulation purposes, e.g., for influencing the idling speed or for switching on or switching off consumers in the control device of the internal combustion engine. This control device is designated by 25 and is connected via leads to various points of the internal combustion engine or voltage regulator 12 or to consumers. Only the connections between DA and control device 25 and between B+ and control device 25 are shown.

Important quantities for optimal voltage regulation such as speed n or information concerning the presence of determined operating states of the internal combustion engine, e.g., idling, are fed to the voltage regulator via a connection between control device 25 and the controller 23 of the voltage regulator.

It is also possible to determine speed via a phase input from the alternator in the voltage regulator itself. For this purpose, the signal is fed to the controller 23 of the regulator via line 32 and influences the circuit 24 in an appropriate manner.

The invention is not limited to an alternator with exciter diodes, but can be used in all generators with an exciter winding conducting controllable exciter current IE.

Figure 2:
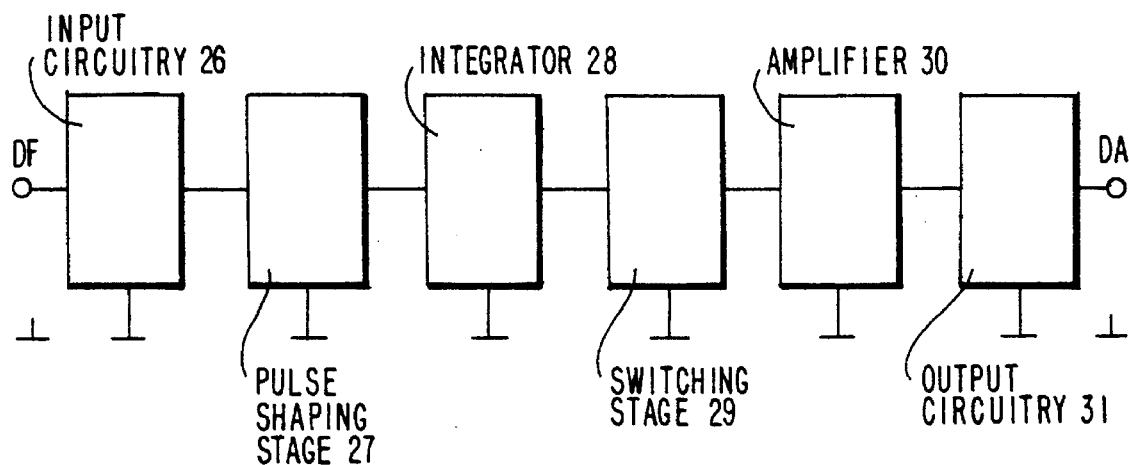

The circuit 24 is illustrated in detail in FIG. 2 in a block diagram showing the input circuitry 26, a pulse shaping stage 27, an integrator 28, a switching stage 29, an amplifier 30 and output circuitry 31. These individual components of the circuit 24 are known per se. The integrator can be an operational amplifier or simply a capacitor/resistor arrangement. Any optional threshold switch or, for example, a Schmitt trigger can be used as a switching stage. When using a Schmitt trigger a switching hysteresis can be achieved. The upper and lower thresholds do not coincide.

A conventional operational amplifier can be used as amplifier. The input and output circuitry corresponds to a conventional switching amplifier. The output circuitry is designed corresponding to the control device 25.

The voltage regulator/alternator arrangement shown in FIG. 1 generates the electrical energy required in the motor vehicle. The voltage regulator regulates the alternator output voltage in such a way that it remains constant regardless of speed and load. During the normal operating state and barring especially strict requirements on the output delivered by the alternator when the speed is higher than the idling speed, no additional steps beyond those of conventional alternator regulation are required.

During idling, however, operating states can occur in which the delivered output can no longer meet requirements. In such cases, an increase in the engine speed and accordingly in the alternator speed can bring about an increase in the output delivered by the alternator or unessential consumers can be switched off. This ensures improved battery charging. Therefore, in such a case, the circuit 24 is activated by the control device 25 or the control device is activated by circuit 24. In so doing, a signal is formed at the output of the circuit 24 which can be used directly to increase the alternator speed. For this purpose, the exciter current duty cycle adjusted at terminal DF is evaluated in the circuit 24 which is constructed by integration technique and accommodated in the regulator housing. This duty cycle is suitably processed in the input circuit 26 and converted in the pulse shaping stage into a pulse shape for further processing.

The pulses formed from the signal tapped at DF are integrated in the integrator 28 over a predetermined period of time. The output signal of the integrator is compared with a threshold value in the threshold stage which switches, for instance, when the threshold value is exceeded.

The arrangement is so designed that a high signal level occurs at the output of the switching stage 29 in the event that the exciter current duty cycle T is greater than 95%, for example, i.e., when the switch-on period of the transistor 20 is greater than 95% relative to the switch-off period. When the value falls below the threshold value, the switching stage 29 does not immediately switch back to the low signal level, but only does this when the exciter current duty cycle T has fallen below a value of 75%, for example. Accordingly, a switching hysteresis of, e.g., 20% is achieved.

If the exciter current duty cycle lies below 95% when switching on, the output of the switching stage remains at a low level, a reverse switching is effected only after exceeding 95%.

The signal formed at the output of the switching stage 29 is boosted in the amplifier 30 so that an output signal which is less than 2 volts in its low state and greater than 2 volts in its high state is formed at terminal DA.

As a result of this logic, steps such as increasing speed or switching off load can be initiated directly by the high state, whereas the low state does not initiate any steps.

In order to limit the action of the circuit 24 to a range corresponding to the idling range, a suitable activating signal is supplied to the circuit 24 by the control device 25 via another connection or the signal coming from connection DA is only processed in the control device when idling operation is detected or when the speed n of the internal combustion engine lies below a given value, e.g., 1000 rpm. The speed is measured by a suitable speed sensor whose output signals are evaluated in the control device or directly in the regulator by evaluating the phase signal.

We claim:

1. A voltage regulator for regulating an output voltage of an alternator which is driven by an internal combustion engine and supplies a variable load with electric power, and also has an exciter winding connected in series with switching means and conducting a portion of the output current, wherein the switching means is switched on or off so that a substantially constant output voltage of the alternator is adjusted regardless of a loading of the alternator, the voltage regulator comprising a circuit which determines an exciter current duty cycle and shapes it to form a signal which adopts a first state when the exciter current duty cycle lies above a first given value and adopts a second state when the exciter current duty cycle lies below a second given value.

2. A voltage regulator as defined in claim 1, wherein said circuit includes at least one integrator and a switching stage connected downstream of said integrator so that an output signal of said integrator influences a switching state of said switching stage.

3. A voltage regulator as defined in claim 2, wherein said circuit includes a pulse shaping stage arranged upstream of said integrator.

4. A voltage regulator as defined in claim 2, wherein said switching stage is formed so that an output signal of said switching state is boosted.

5. A voltage regulator as defined in claim 1, wherein said circuit is integrated in the voltage regulator; and further comprising a connection arranged so that said signal can be tapped at the voltage regulator via said connection.

6. A voltage regulator as defined in claim 1; and further comprising a control device of a internal combustion engine; and a connection which connects said circuit with said control device so that said signal is fed to said control device and is used by said control device to regulate a speed of the internal combustion engine.

7. A voltage regulator as defined in claim 6, wherein said control device is formed so that it regulates an idling speed of the internal combustion engine.

8. A voltage regulator as defined in claim 1; and further comprising a control device of the internal combustion engine, said circuit being formed so that it works only when a speed of the internal combustion engine lies below a given value, a speed level being determined by said control device which transmits corresponding trigger pulses to said circuit.

9. A voltage regulator as defined in claim 8; and further comprising a threshold value stage formed as a Schmitt trigger with an adjustable switching hysteresis.

10. A voltage regulator as defined in claim 9, wherein said Schmitt trigger is formed so that switching thresholds of said Schmitt trigger are adjusted depending on the exciter current duty cycle, with an upper threshold lying in the range of 95% and a lower threshold lying in the range of 75%.

* * * * *